(12) United States Patent
Manson

(10) Patent No.: US 6,526,825 B2
(45) Date of Patent: Mar. 4, 2003

(54) GRAVITY DEVICE

(75) Inventor: Lewis A. Manson, The Woodlands, TX (US)

(73) Assignee: Neozoic Geophysical Survey, Ltd., The Woodlands, TX (US)

( * ) Notice: Subject to any disclaimer, the term of this patent is extended or adjusted under 35 U.S.C. 154(b) by 150 days.

(21) Appl. No.: 09/796,387

(22) Filed: Feb. 28, 2001

(65) Prior Publication Data
US 2002/0117001 A1 Aug. 29, 2002

(51) Int. Cl.[7] .................................................. G01V 7/00
(52) U.S. Cl. .................................... 73/382 R; 73/382 G
(58) Field of Search .......................... 73/382 R, 382 G, 73/453, 448, 444, 449

(56) References Cited

U.S. PATENT DOCUMENTS

| | | | | |
|---|---|---|---|---|
| 2,367,268 A | * | 1/1945 | Edelmann | 73/448 |
| 4,271,702 A | | 6/1981 | Manson | 73/382 R |
| 4,290,307 A | | 9/1981 | Manson | 73/382 R |
| 4,648,273 A | * | 3/1987 | Ozols | 73/382 R |
| 4,756,191 A | | 7/1988 | Manson | 73/382 R |

* cited by examiner

Primary Examiner—John E. Chapman
(74) Attorney, Agent, or Firm—John R Casperson

(57) ABSTRACT

A gravity measuring instrument comprises a housing, a float, and proximity sensing means between the housing and the float. The housing defines a vertically oriented elongated chamber for containing a liquid. The chamber has an upper end and a lower end. The float is elongated and is positioned in the chamber. The float has an upper end and a lower end. A liquid partly fills the chamber and the float is positioned for free floating movement in the liquid in response to gravity variations. A proximity target is on the lower end of the elongated float and a proximity sensor is supported in immovable relation with the housing beneath the lower end of the elongated float. The sensor provides electrical signals representative of distance between the proximity sensor and proximity target. The design avoids large, upwardly facing, horizontal surfaces on the elongated float to reduce the possibility of erroneous gravity readings due to the accumulation of fluid droplets or dust on such surfaces.

19 Claims, 2 Drawing Sheets

GRAVITY DEVICE

BACKGROUND OF THE INVENTION

1. Field of the invention

This invention relates generally to the field of gravity measurement for the purpose of identifying subsurface anomalies that provide an indication of the presence of ore bodies, hydrocarbon bearing formations, water bearing formations, etc.

2. Background of the invention

Gravity, in the broad sense can be defined as a vector force between the earth and a mass which is attracted to the earth. My earlier U.S. Pat. No. 4,290,307, issued Sep. 22, 1981, (hereinafter my "307" Patent) is directed to an apparatus which measures one of the component vectors, i.e., the vertical component. Another gravity instrument developed for measurement of the horizontal vector component of gravity is disclosed in my U.S. Pat. No. 4,271,702, issued Jun. 9, 1981. Another gravity sensor is disclosed in my U.S. Pat. No. 4,756,191. This sensor of U.S. Pat. No. 4,756,191 measures the vertical component of gravity and provides a more sensitive and efficient system yielding more efficient results as compared to the inventions disclosed in my previous patents.

One phenomenon where gravity measurements of the earth are extremely helpful is in prospecting for minerals. The earth is not a homogeneous body. As a result, variations in the vertical component of gravity over a given geological region may be related to the geology of the region. As an example, large masses of iron ore create regional discontinuities in the measurements which, on proper interpretation, yield valuable information for determining the extent of the mass of iron ore in the earth.

While regional variations in gravity occur, variations also occur at a given locale over long or short periods of time as a result of a variety of reasons including, as an example, movement of extraterrestrial bodies. Accordingly, field gravity measurements need to be compared (by subtraction of time variations) to a common base station measurement (taken during the same time periods) to obtain time invariant local gravity measurements. The correlating and manipulation of the data is generally done by digital computer.

It is also important that the gravity measurement signals being transmitted to the computer take into account the temperature at which the measurement was taken. Otherwise, gravity measurements uncompensated from the standpoint of temperature fluctuations, will exhibit errors. Since my earlier patents, temperature compensation has been enhanced by conducting a series of tests under strict laboratory conditions temperatures from 20° F. to 110° F. to determine the effect of thermal expansion of the fluid that supports the floating unit within the meter and devising a computer program to further compensate for the expansion or contraction of the fluid supporting the floating unit.

It is an object of this invention to further reduce errors in local gravity measurements, and thereby better identify gravity anomalies.

SUMMARY OF THE INVENTION

In one embodiment of the invention, a gravity measuring instrument comprises a housing, a float, and proximity sensing means between the housing and the float. The housing defines a vertically oriented elongated chamber for containing a liquid. The chamber has an upper end and a lower end. The float is elongated and is positioned in the chamber. The float has an upper end and a lower end. A liquid partly fills the chamber and the float is positioned for free floating movement in the liquid in response to gravity variations. A proximity target is on the lower end of the elongated float and a proximity sensor is supported in immovable relation with the housing beneath the lower end of the elongated float. The sensor provides electrical signals representative of distance between the proximity sensor and proximity target.

In my U.S. Pat. No. 4,756,191 (the '191 patent), the proximity target was attached to the top of the float device. When in use, it was discovered that the tank fluid, at times, would splash some fluid droplets atop the detection plate, thus destroying correct calibration. The instant invention overcomes this. If desired, the instant invention can also be used in combination with the groove configuration as disclosed in my '191 patent for providing efficient temperature compensation.

My invention can be used by providing a calibrated pair of a first gravity measuring instrument and a second gravity measuring instrument, each as above described, coupled to suitable signal receiving, digitizing and processing apparatus for recording gravity readings from the electrical signals produced by such apparatus in association with time. The first gravity measuring apparatus is positioned in a first location which is fixed and a first series of gravity readings recorded against time. The second gravity measuring instrument is moved about over a plurality of second locations defining an area to be mapped for gravity anomalies and a second series of gravity readings is recorded by location against time. The first location is spaced apart from the area to be mapped but is sufficiently close to the area to be mapped that any influence exerted by celestial bodies on the first and second gravity measuring instruments at a given time is substantially the same. The existence and location of gravity anomalies in the mapped area is determined by computer processing of the first and second series of gravity readings according to a predetermined relationship between the first and second series of gravity readings.

BRIEF DESCRIPTION OF THE DRAWINGS

So that the manner in which the above recited features, advantages and objects of the invention, as well as others which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only a typical embodiment of this invention and are therefore not to be considered limiting of its scope, for the invention may admit to other equally effective embodiments.

DETAILED DESCRIPTION OF THE INVENTION

The disclosure of my earlier U.S. Pat. No. 4,756,191 is incorporated herein by reference. A primary difference between the gravity measuring apparatus as disclosed therein and the instant invention lies in the location of the proximity target and proximity sensor in the device. A further difference lies in the design of the float and in the mechanism for providing free vertical movement of the float.

Figure 1:
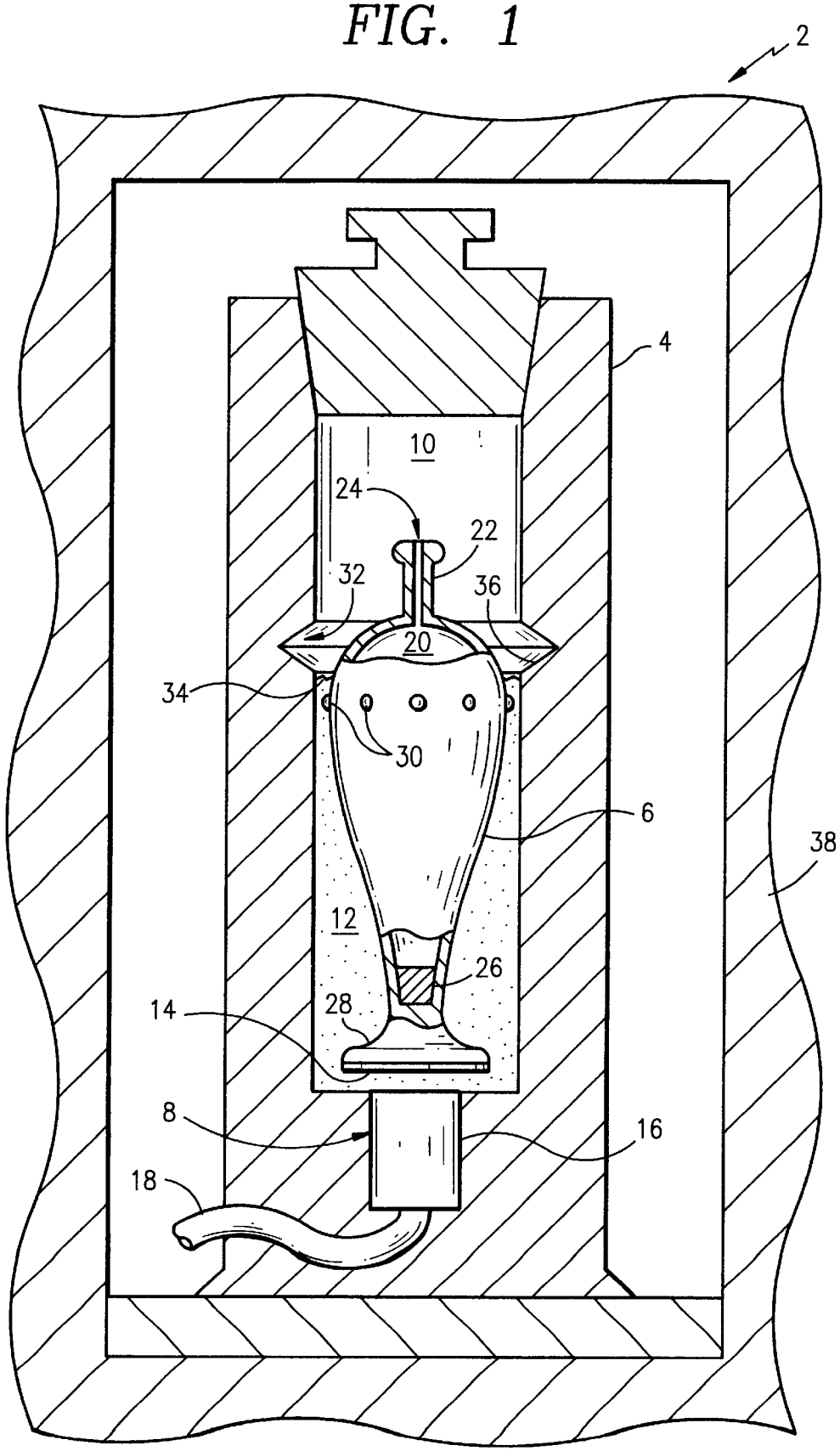
FIG. 1 illustrates, generally in longitudinal sectional view, a hydraulically damped, temperature compensated gravity measurement mechanism constructed in accordance with an embodiment of the present invention.

With reference to FIG. 1, a gravity measuring instrument 2 comprises a housing 4, a float 6, and proximity sensing means 8 for determining a distance between the housing and the float.

The housing defines a vertically oriented elongated chamber 10 for containing a liquid 12. The chamber has an upper end and a lower end. The float is elongated and is positioned in the chamber. The float has an upper end and a lower end. The liquid partly fills the chamber and the float is positioned for free floating movement in the liquid in response to gravity variations. A proximity target 14 is on the lower end of the elongated float and a proximity sensor 16 is supported in immovable relation with the housing beneath the lower end of the elongated float. The sensor provides electrical signals representative of distance between the proximity sensor and proximity target. The signals can be transmitted outside the apparatus via electrical cable 18.

The housing is preferably of generally rectangular configuration but it may take any other suitable form within the spirit and scope of the present invention. The housing is preferably formed of a material having excellent thermal insulation qualities as well as having a low coefficient of thermal expansion. Preferably, the housing is composed of wood or glass. Pyrex® glass is preferred. A housing of square cross-sectional configuration with a minimum wall thickness in the range of about 2 ½ inches at the bottom and sides has been used with good results. The wall thickness provides sufficient thermal insulation quality that a time period of 1 to 6 hours at normal ambient temperature range will pass before the liquid within the housing begins to undergo a consequent temperature change. If desired, however, the internal chamber can be provided with heating and cooling means (not shown) to regulate the temperature.

It has been determined that a fluid 12 which has a very low coefficient of thermal expansion and is also efficient for hydraulic dampening and does not tend to foul internal components of the affinity instrument is most desirable. Most preferred are silicone fluid or ethylene glycol, which have a specific gravity which slightly dampens float movement yet allow the float to move easily responsive to gravity changes. These also protect the float from external shocks by hydraulic dampening.

Preferably, the elongated float includes an internal chamber 20 formed therein. A stem 22 extends from the upper end of the float. The stem is preferably of tubular form and defines a passage 24 which establishes a flow path between the internal chamber of the float and the internal chamber of the housing. As the internal chamber of the housing is itself in communication with the atmosphere, this arrangement compensates the apparatus for fluctuations in atmospheric pressure. The float will not expand or contract in response to external changes in pressure.

The float element is preferably composed of a material having excellent heat insulation quality and also having a low coefficient of thermal expansion. It has been determined that wood material such as kiln-dried mahogany or Pyrex glass is an excellent material for formation of the float element. It is not intended, however, to restrict the present invention to this particular type of wood or to wood itself since any suitable material may be employed which has both excellent thermal resistance and low coefficient of thermal expansion.

A ballast 26 is preferably positioned in a lower portion of the elongated float for maintaining a vertical positioning of the elongated float within the liquid within the chamber. A base structure 28 which is integral with the float forms a large portion of the ballast. However, small amounts of other ballast materials may be positioned in a lower portion of the chamber of the float for calibration purposes. The lower portion of the float chamber is preferably of reduced diameter and defines a ballast receptacle. A suitable ballast material having high specific gravity such as a non-metallic ballast is provided in the ballast chamber. The purpose of the ballast is to provide the lower portion of the float with a "plumb-bob" effect causing it to readily seek a perpendicular position within the fluid disposed within the chamber.

The chamber of the housing is preferably defined by a generally cylindrical inside surface of the housing. The float preferably has a generally circular cross section and an enlarged mid-section which has an exterior surface which is positioned near the generally cylindrical inside surface of the housing. In a preferred embodiment, a plurality of knobs 30 extend generally radially outwardly from the enlarged mid section to center a main body of the float centrally in the chamber of the housing. Each knob preferably has an inner end which is connected to the float and an outer end which is positioned closely adjacent the generally cylindrical surface of the housing.

The float can be generally described in the preferred embodiment as having a generally handle-less amphora-like shape. The proximity target comprises a proximity plate positioned on the lower end of the float to face the proximity sensor. The lower surface of the target is preferably formed by a relatively thin metal sheet of platinum, aluminum or any other material suitable for reflection of position measurement waves such as eddy current, laser beam, radar waves, etc.

As shown in my '191 patent, it is preferred that the housing further defines a liquid expansion cavity 32 communicating with the vertically elongated chamber slightly above an air/liquid interface surface 34 of the liquid partly filling the chamber. This permits expansion of the liquid with minimal vertical change in height of the liquid in the chamber responsive to temperature changes. Most preferably, the liquid expansion cavity is defined in part by oppositely directed intersecting frustoconical surfaces which together define a V-notch extending generally circumferentially around the vertically elongated chamber.

Changes of fluid elevation within the internal chamber due to thermal effect are automatically compensated by the liquid expansion cavity. The cavity preferably exists around the entire upper portion of the tank. As the fluid level of the tank rises or falls due to thermal effect, the fluid moves laterally along the bottom surface 36 of the cavity which is at a taper of preferably approximately 25 degrees upwardly from the horizontal. Thus, the fluid level is substantially maintained at the same level within the tank even though fluid volume slightly increases or decreases due to thermal effect. The normal liquid level within the chamber is preferably approximately at the level where tapered surface intersects the cylindrical surface forming the chamber. The taper of the surface causes fluid to drain back into the chamber in the event rough handling causes splashing of liquid into the liquid expansion portion of the cavity. This insures that proper liquid level is maintained.

Also as generally described in my earlier patent, the float, the housing and the liquid are each preferably composed of a material having a low coefficient of thermal expansion.

The housing is preferably composed of wood or plastic. The elongated float is preferably composed of wood or glass.

The housing is preferably mounted in a case 38 which is preferably secured to a support stand. The support stand preferably provides single point support so that the housing and float are always oriented vertically when the device is in use. See FIG. 5 of my '191 patent.

The instrument is used in conjunction with signal receiving, processing and display apparatus electrically connected to the proximity sensor via the cable 18. Preferably, the instrument is used in conjunction with comparator apparatus 40.

Figure 2:
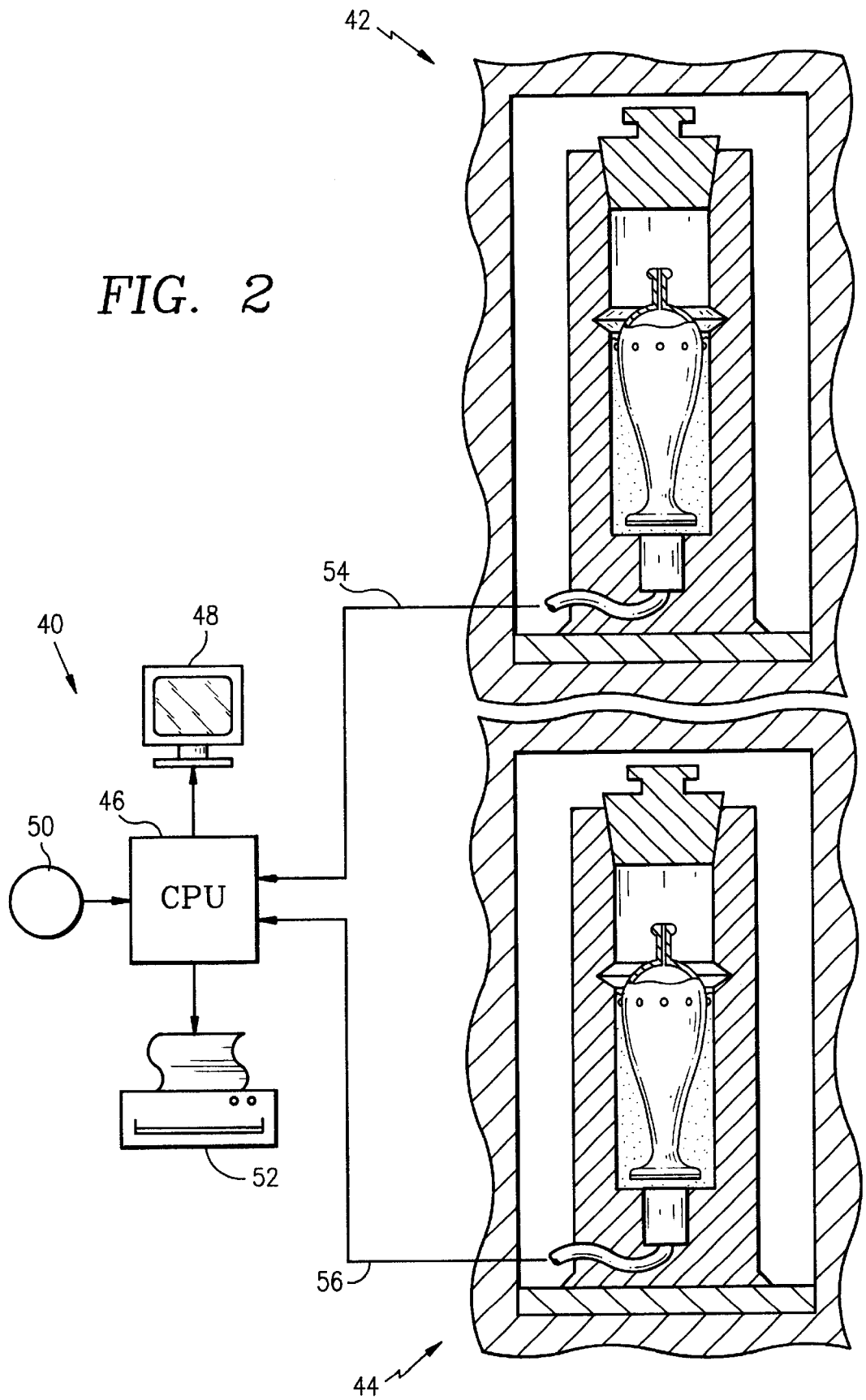
FIG. 2 illustrates, generally schematically, a system for detecting gravity anomalies in accordance with an embodiment of the invention.

FIG. 2 shows one embodiment of comparator apparatus operating in conjunction with a pair of measuring devices 42, 44. In the illustrated device, a CPU 46, which is operably associated with the necessary computer instructions, a monitor 48, user input devices 50, which can include provision for automatic or manual input of G.P.S. data, for example, and a printer 52, functions as the comparator. In the illustrated embodiment, signal transmitting cables 54, 56 from multiple instruments are shown feeding into the CPU unit, although it is to be understood that the information could be transmitted to the comparator by radio waves, modems, transferring storage devices, downloads, etc. The lines represent data flow rather than physical connection. The comparator could be physically located near the base station, the field station, or elsewhere. Utilizing G.P.S. data allows accurately locating the position on land or at sea of each station and further allows the printer unit to print a map that give accurate locations of each station in addition to a graph of station gravity values.

In FIG. 2, there is provided a calibrated pair of a first gravity measuring instrument 42 and a second gravity measuring instrument 44. Each gravity measuring instrument is preferably as described above. These devices are each coupled to suitable signal receiving and processing apparatus for recording values for the electrical signals produced by such apparatus in association with time. The first gravity measuring apparatus is positioned in a first location which is fixed and a first series of gravity readings recorded against time. The second gravity measuring instrument is moved about over a plurality of second locations (stations) defining an area to be mapped for gravity anomalies and a second series of gravity readings is recorded by location against time. The first location is spaced apart from the area to be mapped but is sufficiently close to the area to be mapped that any influence exerted by celestial bodies on the first and second gravity measuring instruments at a given time is substantially the same. The existence and location of gravity anomalies in the mapped area is determined by computer processing of the first and second series of gravity readings according to a predetermined relationship between the first and second series of gravity readings.

Preferably, the predetermined relationship is functionally equivalent to subtracting out the influence exerted by celestial bodies in the second series of readings. Since the readings between the two instruments is also influenced by temperature differences, it is also preferred to record temperature readings for the first and second gravity measuring instruments against time and to factor out the influence caused by temperature differences between the first and second series of gravity readings. In one embodiment, the first series of readings is taken at constant temperature and predetermined control data is obtained by utilizing the second gravity measuring instrument to record gravity readings at a nearby location at different temperatures. The calibration data thus obtained is used to factor out the influence caused by temperature differences between the first and second series of gravity readings.

Since the objective is to determine the exact location of anomalies, G.P.S. data is preferably recorded to indicate the locations of the second series of gravity readings. Gravity readings taken at the same time by the two instruments are preferably compared to determine the anomalies. However, the influence of celestial bodies generally changes relatively slowly except when the celestial body exerting the influence is near its azimuth, so for many purposes, comparing readings taken at nearly the same time will give good results.

During operation, a measurement apparatus may be set at a gravity reading station and within a few seconds time, the digital reader may be activated thereby providing a quick and efficient gravity reading. The device may be transported quickly to another gravity measurement site for another simple and quick gravity measurement. Through use of the equipment of this invention, a significantly long gravity traverse may be accomplished within a very short period of time. The change in gravity may be measured in several ways, i.e., by linear distance of movement by the float in parts per inch, deflection of angle of light, in milligrams of weight differential, by eddy current proximity sensor, by laser measurement device, radar measurement device, etc. This can include a method whereby the float drives a balanced indicator which amplified the float movement allowing the changes to be read on a visual scale.

The method utilized to measure float movement within the tank in one embodiment can employ a digital reader which is connected by electric cable to an eddy current proximity sensor typically referred to as a gun. The proximity sensor is mounted below the float target at a prescribed distance (typically approximately ¼ inch). The signal of the proximity sensor which is converted into milligram increments bounces off of the float target and is converted electronically into a numerical value (milligrams) by a digital reader which in turn indicates the value on the face of the reader and/or conveys the information to the computer data storage device. The reader, whether it be the hand-held portable type for use in the field or the main base unit function in essentially the same manner. The main base unit of the signal processing system automatically records the daily diurnal curve produced by the float movement. This curve is then deducted from the field values obtained by identical instruments used in the field surveys. The computer program is designed to receive digital information of the main base unit and field units and to process the signals to extrapolate net gravity values. The computer program also allows data manually put into the computer to be extrapolated by the field data and compensated by the diurnal curve, and if necessary, to compensate for temperature (a built in factor in the program), compute net values for each station measured in the field and the matched time values are registered at both field stations and base station. These values are then printed out automatically from net results, and tabulated and processed by the built-in program stored in the computer. Additionally, a graph is plotted along with the data. A plotter coupled to the computer plots a graph, field station number field station value and prints nomenclature of the work.

Another component of the gravity measuring system of the present invention is the programming of the "normal" value of gravity in any given area. When values increase or decrease from "normal," the values are then indicated as (1) a fault zone, (2) a fracture zone, (3) a major change in the class of rock which could also indicate the presence of an ore body, or (4) a liquid bearing zone such as a hydrocarbon zone, water zone, etc. This program in the computer allows the printout of the values to be shown on the printed graph the four classes of values obtained in the field. The degree of change from normal allows the interpreter to immediately recognize any of the four types of changes and whether an ore body or a hydrocarbon or water zone is of commercial significance.

While the foregoing is directed to the preferred embodiment, the scope of the present invention is determined by the claims which follow:

What is claimed is:

1. A gravity measuring instrument comprising:
    a housing which defines a vertically oriented elongated chamber for containing a liquid, said chamber having an upper end and a lower end;
    an elongated float positioned in the chamber, said float having an upper end and a lower end;
    a liquid partly filling the chamber;
    wherein said elongated float is positioned for free floating movement in said liquid within said elongated vertically oriented cavity in response to gravity variations;
    a proximity target positioned on the lower end of the elongated float; and
    a proximity sensor supported in immovable relation with said housing beneath the lower end of the elongated float, for providing electrical signals representative of distance between the proximity sensor and proximity target.

2. A gravity measurement instrument as in claim 1, wherein:
    said elongated float includes an internal chamber formed therein and a stem extending from the upper end of the float, said stem being of tubular form and defining a passage which establishes a flow path between the internal chamber of the float and the atmosphere.

3. A gravity measuring instrument as in claim 1, further comprising
    a ballast positioned in a lower portion of said elongated float for maintaining a vertical positioning of said elongated float within said liquid within said chamber.

4. A gravity measuring instrument as in claim 1 wherein
    the chamber is defined by a generally cylindrical inside surface of the housing, and
    the float has a generally circular cross section and an enlarged mid-section which has an exterior surface which is positioned near the generally cylindrical inside surface of the housing.

5. A gravity measuring instrument as in claim 4 wherein the float further has a plurality of knobs extending generally radially outwardly from the enlarged mid section to center a main body of the float centrally in the chamber of the housing.

6. A gravity measuring instrument as in claim 5 wherein each knob has an inner end which is connected to the float and an outer end which is positioned closely adjacent the generally cylindrical surface of the housing.

7. A gravity measuring instrument as in claim 6 wherein the main body of the float has a generally handle-less amphora-like shape and the proximity target comprises a proximity plate positioned on the lower end of the float to face said proximity sensor.

8. A gravity measuring instrument as in claim 1 wherein the housing further defines a liquid expansion cavity communicating with the vertically elongated chamber at or slightly above an air/liquid interface surface of the liquid partly filling the chamber to permit expansion of said liquid with minimal vertical change in height of said liquid in said chamber responsive to temperature changes.

9. A gravity measuring instrument as recited in claim 8, wherein:
    said liquid expansion cavity is defined in part by oppositely directed intersecting frustoconical surfaces which together define a V-notch extending generally circumferentially around the vertically elongated chamber.

10. A gravity measuring instrument as in claim 1 wherein the float, the housing and the liquid are each composed of a material having a low coefficient of thermal expansion.

11. A gravity measurement instrument as in claim 10 wherein
    said housing is composed of glass.

12. A gravity measurement instrument as recited in claim 10 wherein
    said elongated float is composed of glass.

13. A gravity measurement instrument as in claim 1 further comprising
    signal receiving and processing apparatus connected with said proximity sensor.

14. A method for mapping gravity anomalies near the land or water surfaces of the earth, said method comprising
    providing a calibrated pair of a first gravity measuring instrument and a second gravity measuring instrument,
    each said gravity measuring instrument comprising
        a housing which defines a vertically oriented elongated chamber for containing a liquid, said chamber having an upper end and a lower end;
        an elongated float positioned in the chamber, said float having an upper end and a lower end;
        a liquid partly filling the chamber;
        wherein said elongated float is positioned for free floating movement in said liquid within said elongated vertically oriented cavity in response to gravity variations;
        a proximity target positioned on the lower end of the elongated float; and
        a proximity sensor supported in immovable relation with said housing beneath the lower end of the elongated float, for providing electrical signals representative of distance between the proximity sensor and proximity target;
    positioning the first gravity measuring apparatus in a first location which is fixed and recording a first series of gravity readings against time;
    moving the second gravity measuring instrument about over a plurality of second locations defining an area to be mapped for gravity anomalies and recording a second series of gravity readings by location against time,
    wherein said first location is spaced apart from the area to be mapped but is sufficiently close to the area to be mapped that any influence exerted by celestial bodies on the first and second gravity measuring instruments at a given time is substantially the same, and
    determining the existence and location of gravity anomalies in the mapped area by computer processing of the first and second series of gravity readings according to a predetermined relationship between the first and second series of gravity readings.

15. A method as in claim 14 the predetermined relationship is functionally equivalent to subtracting out the influence exerted by celestial bodies in the second series of readings.

16. A method as in claim 14 further comprising recording temperature readings for the first and second gravity measuring instruments against time and factoring out the influence caused by temperature differences between the first and second series of gravity readings.

17. A method as in claim 16 wherein the first series of readings is taken at constant temperature and predetermined control data obtained by utilizing the second gravity measuring instrument to record gravity readings at a nearby location at different temperatures is used to factor out the influence caused by temperature differences between the first and second series of gravity readings.

18. A method as in claim 14 further comprising recording G.P.S. data to indicate the locations of the second series of gravity readings.

19. A method as in claim 14 further comprising digitizing the electrical signals to represent gravity readings and processing the digitized signals to identify gravity anomalies.

* * * * *